May 16, 1944.  V. E. MATULAITIS  2,349,185

POWER TRANSMISSION

Filed Aug. 8, 1941  4 Sheets-Sheet 1

INVENTOR
Victor E. Matulaitis
BY
ATTORNEYS.

Patented May 16, 1944

2,349,185

UNITED STATES PATENT OFFICE 2,349,185

POWER TRANSMISSION

Victor E. Matulaitis, Detroit, Mich., assignor to Chrysler Corporation, Highland Park, Mich., a corporation of Delaware Application August 8, 1941, Serial No. 405,948

14 Claims. (Cl. 74—472)

This invention relates to motor vehicles and refers more particularly to power transmission and control mechanism therefor.

My invention has particular reference to transmission systems in which the torque load is relieved, as by momentary interruption of the engine ignition or by other suitable means, in order to unload positively engageable drive control elements so as to facilitate disengagement of such elements. One example of such a transmission is described and claimed in the copending application of Carl A. Neracher et al., Serial No. 335,310, filed May 15, 1940.

It is an object of my invention to provide improved ignition interruption control means for use with a transmission control of the general type aforesaid.

A further object is to provide a novel electrical system incorporating relay means for protecting the ignition against interruption at times other than when desired.

A still further object is to provide an improved operating means for maintaining the ignition grounded out for a predetermined portion of the release stroke of the movable drive control element, such operating means being so arranged as not to interfere either with the moving parts of the releasing means or the interrupter switch.

A further object is to provide means for insuring against the ignition being grounded out for a period of time longer than desired.

Another object is to provide a novel system of ignition interruption control incorporating a time delay relay for the ignition interrupter switch such that the ignition is automatically restored if the ignition tends to be interrupted beyond a predetermined desired length of time.

Further objects and advantages of my invention reside in the novel combination and arrangement of parts more particularly hereinafter described and claimed, reference being had to the accompanying drawings in which:

While my control may be employed in conjunction with various types and arrangements of motor vehicle transmissions, especially where a pair of relatively movable positively engageable drive control elements is employed, in order to illustrate one driving system I have shown my invention in connection with certain parts of the aforesaid Neracher et al. application.

In the drawings A represents the internal combustion engine which drives through fluid coupling B and conventional type of friction main clutch C to the speed ratio transmission D whence the drive passes from output shaft 20 to drive the rear vehicle wheels in the usual manner.

Figures 1, 2:
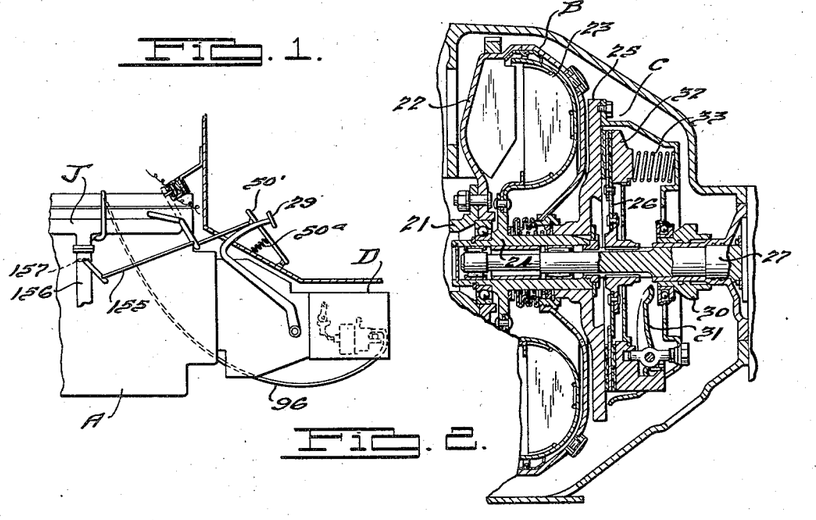
Fig. 1 is a side elevational view showing the motor vehicle engine and power transmission.
Fig. 2 is a longitudinal sectional elevational view through the main clutching mechanism.

The engine crankshaft 21 carries the vaned fluid coupling impeller 22 which in the well known manner drives the vaned runner 23 whence the drive passes through hub 24 to clutch driving member 25. This member then transmits the drive, when clutch C is engaged as in Fig. 2, through driven member 26 to the transmission driving shaft 27 carrying the main drive pinion 28. A clutch pedal 29 controls clutch C such that when the driver depresses this pedal, collar 30 is thrust forward to cause levers 31 to release the clutch driving pressure plate 32 against springs 33 thereby releasing the drive between runner 23 and shaft 27. The primary function of the main clutch C is to enable the driver to make shifts between neutral, forward, and reverse in transmission D.

Referring to the transmission, pinion 28 is in constant mesh with gear 34 which drives countershaft 35 through an overrunning clutch E of the usual well known type such that when shaft 27 drives in its usual clockwise direction (looking from front to rear) then clutch E will engage to lock gear 34 to countershaft 35 whenever the gear 34 tends to drive faster than the countershaft. However, whenever this gear 34 tends to rotate slower than the countershaft then clutch E will automatically release whereby shaft 27, under certain conditions, may readily drop its speed while countershaft 35 continues to revolve.

Figure 3:
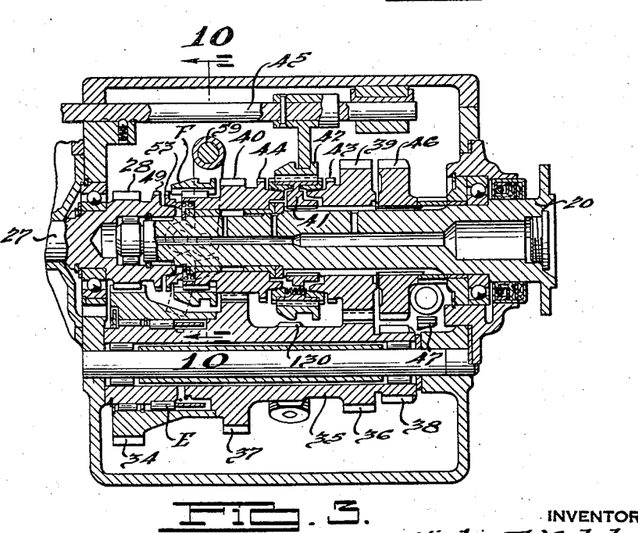
Fig. 3 is a similar view through the change speed transmission.
Figure 4:
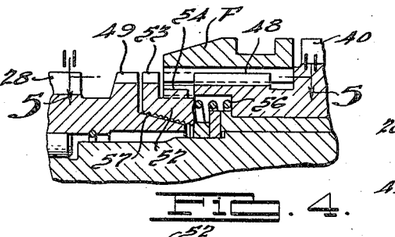
Fig. 4 is a detail enlarged view of the blocker clutch as seen in Fig 3.

Countershaft 35 comprises cluster gears 36, 37 and 38 which respectively provide drives in first, third and reverse. Freely rotatable on shaft 20 are the first and third driven gears 39 and 40 respectively in constant mesh with countershaft gears 36 and 37. A hub 41 is splined on shaft 20 and carries therewith a manually shiftable sleeve 42 adapted to shift from the Fig. 3 neutral position either rearwardly to clutch with teeth 43 of gear 39 or else forwardly to clutch with teeth 44 of gear 40. Sleeve 42 is operably connected to shift rail 45 adapted for operation by any suitable means under shifting control of the vehicle driver.

Shaft 20 also carries reverse driven gear 46 fixed thereto. A reverse idler gear 47 is suitably mounted so that when reverse drive is desired, idler 47 is shifted into mesh with gears 38 and 46.

First, third and reverse speed ratio drives and neutral are under manual shift control of the vehicle driver, the main clutch C being released by depressing pedal 29 in shifting into any one of these drives.

First is obtained by shifting sleeve 42 to clutch with teeth 43, the drive passing from engine A, through fluid coupling B, clutch C and shaft 27 to pinion 28, thence through gear 34 and clutch E to countershaft 35. From the countershaft the drive is through gears 36, 39 and sleeve 42 to shaft 20.

Third is obtained by shifting sleeve 42 to clutch with teeth 44, the drive passing from the engine to the countershaft 35 as before, thence through gears 37, 40 and sleeve 42 to shaft 20.

Reverse is obtained by shifting idler into mesh with gears 38, 46, sleeve 42 being in neutral, the reverse drive passing from the engine to the countershaft 35 as before, thence through gears 38, 47 and 46 to shaft 20.

Slidably splined on teeth 48 carried by gear 40 is the automatic clutching sleeve F which, under certain conditions, is adapted to shift forwardly to clutch with teeth 49 carried by pinion 28 thereby positively clutch shaft 27 directly to gear 40. The sleeve F is adapted to step-up the speed ratio drive from first to second and from third to fourth which is a direct drive speed ratio. Control means is provided which limits clutching of sleeve F to approximate synchronism with teeth 49 and also to a condition of engine coast, sleeve F being prevented from clutching during that condition known as engine drive as when the engine is being speeded up under power.

When driving in first, second is obtained by the driver releasing the usual accelerator pedal 50' thereby allowing spring 50ª to close the engine throttle valve and cause the engine to rapidly coast down. When this occurs, the engine along with shaft 27, pinion 28 and gear 34 all slow down while shaft 20 along with gears 39 and 36 continue their speeds by accommodation of clutch E which now overruns. The engine slows down until teeth 49 are brought to approximate synchronism with sleeve F which thereupon automatically shifts to clutch with teeth 49 resulting in a two-way drive for second as follows: pinion 28 through sleeve F to gear 40 thence through gears 37, 36 and 39 to sleeve 42 and shaft 20, the clutch E overrunning.

When driving in third, fourth or direct is obtained just as for second by driver release of the accelerator pedal and resulting shift of sleeve F to clutch with teeth 49 when these parts are synchronized by reason of the engine coasting down from the drive in third. The direct drive is a two-way drive as follows: pinion 28 through sleeve F to gear 40 thence directly through sleeve 42 to shaft 20, clutch E overrunning as before.

Referring to Figs. 4 to 9 there is shown the blocking means for controlling clutching shift of sleeve F so as to limit clutching thereof to engine coasting and synchronous relationship of the clutching parts. Sleeve F is provided with a series of pairs of what may be termed long and short teeth 50, 51 certain of which may be bridged or joined together. A blocker ring 52 is provided with blocking teeth 53 which either lie in the path of forward shift of teeth 50 or 51 or else between these teeth to allow clutching shift of sleeve F. Thus, blocker 52 has, at suitable locations, a drive lug 54 engaged in a slot 55 of gear 40. The blocker is urged under light energizing pressure of spring 56 into constant frictional engagement at 57 with pinion 28 so that the blocker tends to rotate with pinion 28 within the limits afforded by the travel of lug 54 circumferentially in slot 55.

Figure 5:
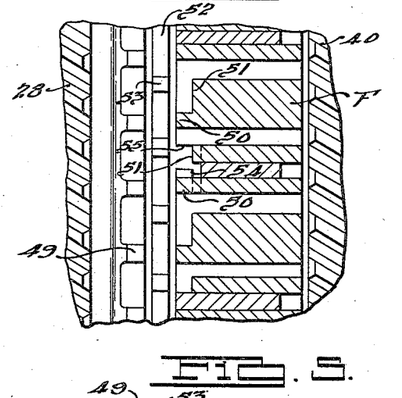
Fig. 5 is a sectional plan view illustrated as a development according to line 5—5 of Fig. 4, the automatic clutching sleeve being released.
Figure 6:
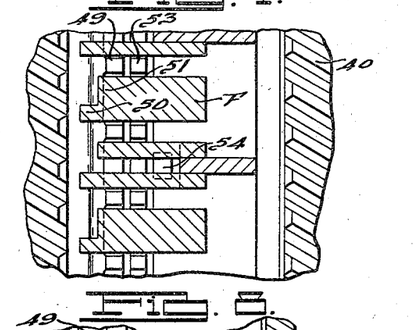
Fig. 6 is a similar view showing the automatic clutching sleeve in its intermediate shift position during the drive blocking condition.

During drive in first and third, the speed of shaft 27 exceeds the speed of gear 40 so that, if sleeve F is fully released, the parts will be positioned as in Fig. 5 wherein the blocker teeth 53 are axially in alignment with the short teeth 51. If now the sleeve F is urged forwardly it will move to the Fig. 6 position of drive blocking and will remain in this blocked position as long as the engine drives the car in first or third.

Figure 7:
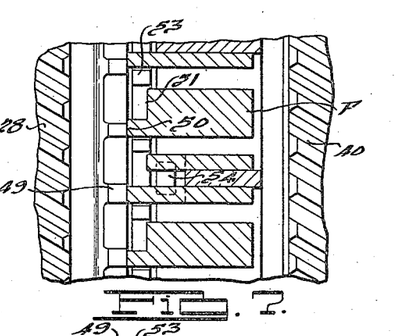
Fig. 7 is a similar view showing the automatic clutching sleeve in its coasting relationship for the Fig. 6 showing, the clutching sleeve being unblocked during coast for its clutching movement.
Figure 8:
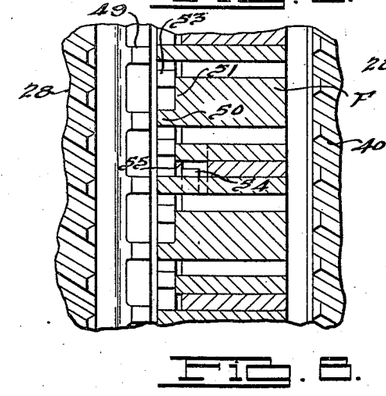
Fig. 8 is a similar view showing the automatic clutching sleeve in full clutching engagement.

If now the driver releases the accelerator pedal so that the engine may coast down under accommodation of overrunning clutch E, while sleeve F is urged forwardly, then when pinion 28 is reduced in speed to that of sleeve F slight further drop in speed of pinion 28 for a fraction of a revolution below the speed of sleeve F will cause blocker 52 to rotate slightly relative to sleeve F until blocker teeth 53 strike the adjacent sides of long teeth 50 as in Fig. 7 thereby limiting further reduction in speed of the blocker relative to sleeve F. At this time the sleeve F is free to complete its forward clutching shift with teeth 49, as in Fig. 8, the blocker teeth 53 passing between adjacent long and short teeth 50, 51. With the sleeve F thus clutched during engine coast, a two-way drive is established in second or fourth depending on whether the manually shiftable sleeve F was set for first or third just prior to the clutching shift of sleeve F.

Figure 9:
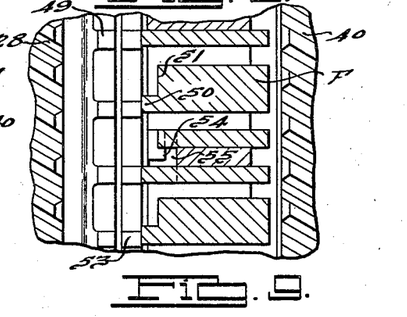
Fig. 9 is a view similar to Fig. 5 but showing the automatic clutching sleeve in its other intermediate shift position during the coast blocking condition.

In the event that sleeve F is urged forwardly from its Fig. 5 position at a time when the gear 40 is rotating faster than pinion 28, then the blocker 52 will lag behind the sleeve and will be blocked by engagement of long teeth 50 with the blocker teeth 53 as shown in Fig. 9. This is referred to as the coast blocking condition. If now the engine is speeded up by the driver depressing the accelerator pedal in the usual manner, then the engine and blocker 52 rotate forwardly and blocker teeth 53 move over to the Fig. 6 drive blocking position thereby jumping the gap between teeth 50 and 51. This is the primary reason for providing the long and short teeth whereby sleeve F clutches only from the drive blocking condition followed by engine coast which protects the teeth and avoids harsh clutching effects on the passengers and transmission mechanism. On accelerating the engine from the Fig. 9 coast blocking condition, the engine comes up to a speed limited by engagement of the overrunning clutch E for drive in either first or third depending on the setting of the manual shiftable sleeve 42. Then on releasing the accelerator pedal the sleeve F will synchronously clutch with teeth 49 during coast to step-up the drive to either second or fourth as aforesaid.

Figures 10, 11, 12:
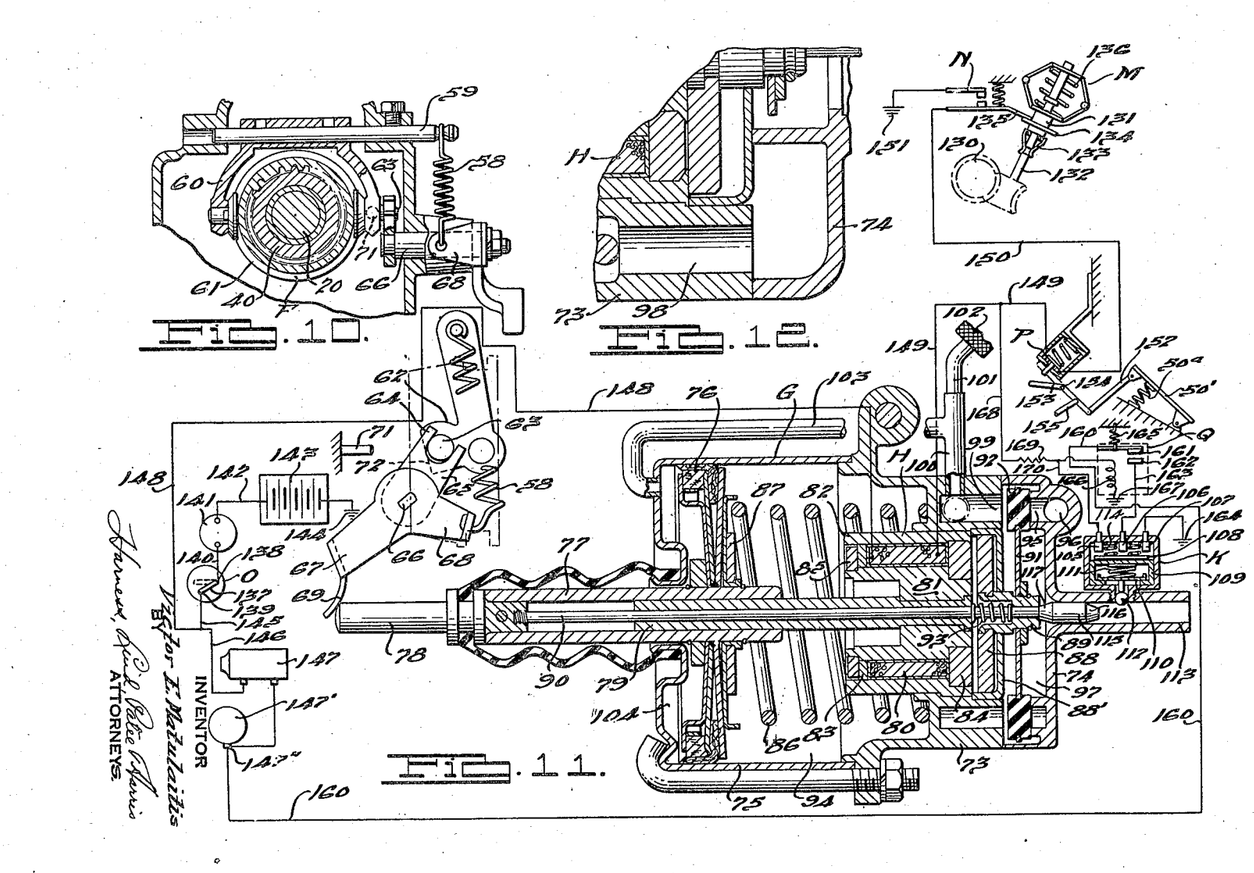
Fig. 10 is a sectional elevational view taken approximately as indicated by line 10—10 in Fig. 3 but showing only the upper portion of the transmission mechanism and particularly the lever operating mechanism for the automatic clutching sleeve.
Fig. 11 is a diagrammatic view of the control mechanism for the automatic clutching sleeve, the latter being shown in its released position.
Fig. 12 is a detail enlarged sectional plan view taken as indicated by line 12—12 of Fig. 13.
Figures 12, 13, 14, 15, 16:
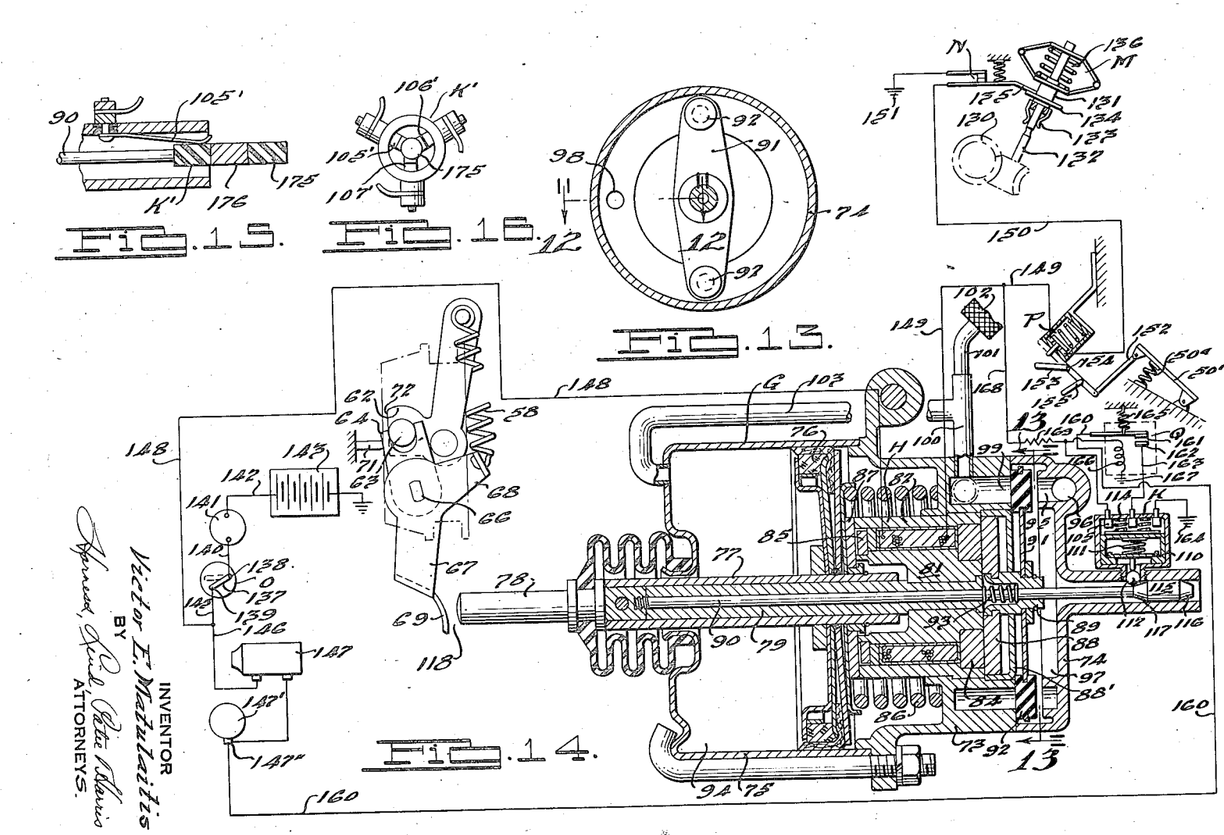
Fig. 13 is a sectional elevational view taken as indicated by line 13—13 of Fig. 14.
Fig. 14 is a view generally similar to Fig. 11 but illustrating the parts in positions corresponding to engaged position of the automatic clutching sleeve.
Fig. 15 is a sectional elevational view illustrating a modified form of ignition interrupter switch.
Fig. 16 is an end view of the Fig. 15 switch.

The transmission is provided with prime mover means for controlling shift of sleeve F along with several control means. Referring particularly to Figs. 11 and 14, there is illustrated a pressure fluid operated motor G utilizing differential air pressure for its operation. For convenience this motor is arranged to operate by the "vacuum" in the intake manifold system of the engine under control of electromagnetic means.

Forward shift of sleeve F is effected, under control of motor G, by reason of a spring 58 having its upper end fixed by engaging the outboard portion of a transverse shaft 59 fixed in the housing of transmission D. Mounted to freely rock on shaft 59 is a shift yoke 60 which engages the shift groove 61 of sleeve F. This yoke having one of its arms provided with a forwardly extending lever 62 carrying a lateral pin 63 which engages the yoke portion 64 of an upstanding lever 65. This lever 65 is fixed to the inboard end of a rockshaft 66 the outboard end of which has fixed thereto a bell-crank follower lever member having lever arms 67 and 68. The end of lever 68 is connected to the lower end of spring 58 and lever 67 carries an actuating abutment portion 69.

Spring 58 acts to yieldingly urge engagement of sleeve F, acting through lever 68, shaft 66 and lever 65, to cause pin 63 to swing yoke 60 forwardly on its shaft 59 until, when sleeve F is fully engaged, a stop pin 71 engages the forward flat face 72 of lever 62. This limits rearward swing of lever 67.

The motor G comprises a central body part 73 to which is secured the rear part 74 and the forward cylindrical closure part 75. A piston 76 slidably fits within cylinder 75 and is centrally secured to the rear portion of a hollow reciprocatory leader member or piston rod 77. The forward end of this piston rod carries an abutment leader rod or pin 78 fixed thereto and arranged to engage abutment 69 during its arcuate swing about the axis of shaft 66. The rear end of rod 77 is slidably mounted on a tubular support guide 79 which is part of a fixed assembly H for the coil 80 and inner and outer flux-directing iron cylinders 81, 82 connected by non-magnetic spacers 83, 84. A ferrous ring 85 is arranged with a gap between the front ends of cylinders 81 and 82 to provide a shunt flux path.

Thrusting forwardly on piston 76 is a sleeve-releasing or kickdown spring 86 of much greater force than that of spring 58 so that spring 86 can act to release sleeve F as in Fig. 11. In order to releasably hold the piston in its Fig. 14 position, a plate armature 87 is fixed to the rear face of the piston and adapted to engage the front ends of cylinders 81, 82 to complete the flux path at this point. The electromagnet H is of sufficient strength to hold piston 76 retracted against the force of spring 86.

At the rear of the part 73 there is provided a second plate armature 88 engageable as in Fig. 14 with the rear faces of cylinders 81, 82. A shield 88' is stationary and protects coil 80 against moisture and shields it magnetically. This armature is fixed to a sleeve 89 slidably on a switch operator or rod 90 which extends forwardly through guide 79 and piston rod 77 for attachment to the latter whereby rod 90 moves back and forth with the piston 76. Sleeve 89 mounts a support 91 carrying a valve member 92, a spring 93 acting between the rear end of the fixed guide 79 and sleeve 89 so as to bias valve member 92 to its Fig. 11 position of shutting off vacuum supply to the cylinder chamber 94 and venting the same.

The part 74 is formed with a valve seat 95 cooperable with valve 92 to control supply of vacuum from pipe 96 to chamber 97 in part 74, this chamber being always directly open to the working chamber 94 by a passage 98 as shown in Figs. 12 and 13. Pipe 96 extends forwardly for communication with the vacuum in the engine intake manifold J. The part 73 has a valve seat 99 also cooperable with valve 92 to control venting communication between chambers 94, 97 and vent pipe 100 which has one branch 101 leading to the atmosphere at the air cleaner 102 and a second branch 103 open to the cylinder chamber 104 forwardly of piston 76. It will be apparent that when the electromagnet H is energized, armature 88 will move forwardly to its Fig. 14 position of placing chamber 94 in communication with the intake manifold J, and when the electromagnet is de-energized as in Fig. 11 then spring 93 will bias valve 92 so as to vent chamber 94.

I have provided means functioning to relieve the thrust-application between the teeth of sleeve F and the teeth 49 thereby facilitating movement of the drive control sleeve element F from its Fig. 14 position of engaging relationship into its Fig. 11 position of disengaging relationship with respect to teeth 49. This relief means is in the form of a system of grounding the primary terminal of the usual distributer of the engine ignition system whereby the engine ignition may be momentarily rendered inoperative thereby unloading the torque at sleeve F sufficiently to insure its release by spring 86.

The ignition interrupting system comprises an interrupter switch K having switch terminals 105, 106 and 107 adapted to be bridged for switch closing function by a conductor 108 which is carried by cup 109 within which is seated a piston 110 by a spring 111. A ball 112 projects into the rear cylindrical extension 113 of part 74 and is adapted to be moved outwardly thereby acting through piston 110, spring 111, and cup 109 to engage conductor 108 with terminals 105, 106, and 107, the spring 111 serving to accommodate any excess outward movement of ball 112 beyond that necessary to seat the conductor on the terminals. One or more springs 114 act to bias the parts into their Fig. 11 switch open positions.

The rear end of rod 90 has an enlarged cam portion 115 slidably fitting the cylinder 113 and bounded by inclined faces 116 and 117. The arrangement is such that when piston 76 is retracted by vacuum from its Fig. 11 position to its Fig. 14 position, the inclined face 116 acts to move ball 112 outwardly to close switch K, the switch opening at the end of this piston movement at face 117 as in Fig. 14. At this time the electromagnet H will hold the piston 76 in such retracted position irrespective of the continuance of vacuum in chamber 94. During this rearward or inward movement of the piston, allowing spring 58 to engage sleeve F when synchronized with teeth 49, the ignition is not interrupted even though switch K is closed because of a relay control as will presently be more apparent.

When piston 76 is in its Fig. 14 retracted position and sleeve F is engaged, there is a gap 118 between pin 78 and abutment 69 such that when the electromagnet H is de-energized to allow spring 93 to cause valve 92 to vent chamber 94, then spring 86 is free to move piston 76 outwardly to take up gap 118 during which movement the face 17 acts on ball 112 to close switch K and ground the ignition system whereupon piston 76 then moves further to disengage sleeve F as the torque is relieved at the teeth of the sleeve. The time during which the ignition remains interrupted will depend on the length of cam portion 115 and in practice I have found that an interruption of about one-third of the outward piston stroke is satisfactory for the arrangement illustrated.

In order to effect disengaging shift of sleeve F, the parts being positioned as in Fig. 14 with switch K closed, the electromagnet is de-energized so as to cause valve 92 to vent chamber 94 and allow spring 86 to move piston 76 outwardly the amount of gap 118 thereby causing cam 115 to close switch K and interrupt the ignition under relay control. Spring 86 then moves piston 76 further because the torque is relieved at the teeth of sleeve F. After the piston has completed about one-third of its stroke, switch K begins to open at the face 116 and the ignition is restored. The sleeve F disengages freely and practically instantly with such arrangement. As will presently be apparent, I have provided a relay control whereby the ignition will be automatically restored in the event that switch K should stick closed or should not properly function to restore the ignition within a reasonable time.

It is deemed preferable to provide a speed control on the energization of the electromagnetic coil 80 so as to insure automatic release of sleeve F below a predetermined car speed and to accommodate automatic engagement of sleeve F above a predetermined car speed. Whenever the car is in forward driving condition the manual sleeve 42 is either shifted rearwardly to the low range or forwardly to the high range so that by driving a governor from the countershaft 35 it is possible to provide a speed control operated proportionate to the speed of travel of the car. Driven from countershaft gear 130 is a governor M of any suitable type, this governor operating a sleeve 131 outwardly along its drive shaft 132 as the car speed reaches a predetermined point, the break- away being under control of a detent 133 if desired.

The sleeve 131 has a shoulder 134 engaged by the swinging switch piece 135 of the governor switch N. When the car is stationary the detent 133 is engaged and switch N is open. As the car accelerates, the governor eventually reaches its critical speed and detent 133 releases thereby causing switch N to close. As the car slows down, the governor spring 136 restores the parts to the Fig. 11 position and by proportioning the various parts it is obvious that switch N may be made to function at desired speeds proportionate to car travel. As an example of one arrangement of governor operation and gearing arrangement, the governor may be made to close switch N during car acceleration in first and third respectively at approximately 7 and 15 M. P. H. (miles per hour), the switch N opening on stopping the car in direct and second at approximately 7 and 3 M. P. H. respectively.

The driver operated ignition switch is designated at O and comprises a conductor 137 which, in the Fig. 11 position showing the switch "on" or closed, electrically connects contacts 138 and 139. Contact 138 extends by conductor 140 to ammeter 141 and thence by conductor 142 to the usual storage battery 143 and thence to ground 144. Contact 139 has a conductor 145 extending by conductor 146 branching therefrom to the engine ignition system herein shown in part as comprising coil 147 and distributer 117' having the primary terminal 117''.

A second conductor 148 branches from conductor 145 to one of the terminals of coil 80 and thence by the other terminal to conductor 149 to the kick-down switch P and then by conductor 150 through switch N to ground 151. The switch P is normally closed and is opened preferably by a full depression of accelerator pedal 50' acting through link 152 and a bell-crank lever 153 pivotally mounted at 154. Lever 153 actuates a link 155 which extends forwardly to adjust the engine throttle valve lever 156. When pedal 50' is thus depressed, the lever 156 is positioned to fully open the throttle valve 157 and as the throttle valve is adjusted in its wide-open range the lever 153 opens switch P to effect a step-down in the transmission from fourth to third or from second to first by de-energizing the coil 80.

Switches P and N are in series so as to form a governor kick-down or holding coil circuit as follows: ground 144 to battery 143 thence by conductor 142 to ammeter 141 and by conductor 140 to ignition switch O. From switch O this circuit extends through conductors 145 and 148 to coil 80 and thence by conductor 149, switch P, conductor 150 and switch N to ground 151.

The ignition interrupting system comprises a grounding conductor 160 which extends from the distributer primary terminal 147'' to the swinging point 161 of a time-delay relay Q, thence through the other point 162 and conductor 163 to terminal 106 of switch K, thence by conductor 108 and terminal 107 to ground 164. Relay point 161 is biased to its Fig. 11 open position by the relay spring 165 and is moved to its closed position by the relay coil 166 grounded at one end at 167 and connected at its other end by a conductor 168 and resistance 169 to the conductor 149. A branch conductor 170 extends between terminal 105 and conductor 168 at a point between resistance 169 and coil 166.

With an ordinary 6 volt battery 143 I find, by way of example, that good results are obtained in the illustrated arrangement wherein the holding coil 80 has about two ohms resistance, the resistance 169 about ten to twelve ohms, and the relay coil 166 about fifty ohms. The relationships may of course be varied according to conditions dealt with and results desired.

When driving with sleeve F engaged, as in fourth or direct, the parts will be positioned as illustrated in Fig. 14, the holding coil 80 being energized through the governor kick-down circuit. At this time the current grounds at 154 so that there is no voltage between conductor 149 and ground 167 through resistance 169 and relay coil 166. Therefore the relay points 161, 162 will be open by spring 165.

When the governor kickdown circuit is broken at switch N or P as in bringing the car to a stop or in fully depressing the accelerator pedal, the conductor 168 rises to nearly battery potential and current flows through relay coil 166 thereby closing relay points 161, 162. During this time the coil 80 is de-energized and piston 76 moves outwardly to take up gap 118 and close the interrupter switch K thereby shorting the ignition system through the relay points at ground 164. This ground is as follows: 147", 160, 161, 162, 163, 106, 108, 107, and 164. With the ignition interrupted, sleeve F is disengaged as aforesaid, the ignition ordinarily being restored by opening of switch K approximately after piston 76 has completed about one-third of its outward stroke although this may be made longer if desired by increasing the length of cam 115.

When the interrupter switch K closes in taking up gap 118, terminal 105 is brought to zero ground potential through conductor 108, terminal 107, and ground 164. This de-energizes the relay causing points 161, 162 to open with time delay of approximately 0.5 of a second thereby restoring the ignition system by breaking the ground line between terminal 147" and ground 164 in the event that the ground line is not broken by normal opening of the interrupter switch K. Ordinarily 0.5 of a second is more than the maximum time required to effect disengagement of sleeve F under normal driving conditions of the car. Under conditions where switch K might remain closed after kickdown by the governor switch N or accelerator pedal switch P, the ignition will therefore be automatically restored by separation of relay terminals 161, 162. Current will, under such conditions, flow through conductor 168, resistance 169, terminals 105 and 107 to ground 164 but not sufficiently to cause the holding coil 80 to retract piston 76 or to cause valve 92 to move to its Fig. 14 position of supplying vacuum to chamber 94.

When kickdown occurs, it is therefore desired to energize the relay coil 166 and also to reduce the current through the holding coil 80 sufficiently so that the valve 92 and piston 74 will function to effect release of sleeve F. This desired condition occurs because the ohmic value of resistance 169 plus that of the relay coil 166 is so high that negligible current flows through 168, 169, 170, 105, 108, 107 and 164. At such time the resistance 169 maintains the current through holding coil 80 at still a negligible value while at the same time the relay coil 166 is de-energized. As soon as the governor kickdown circuit is again restored, then the current flows through this circuit and relay points 161, 162 remain open so that as piston 76 is retracted by vacuum the engine does not miss during momentary closing of switch K.

The sequence at kickdown is therefore first a closing of the relay points because switch K is open and either switch N or P is open, then terminals 105, 107 are bridged, then the switch K opens or else the relay points open to protect the system against undue grounding of the ignition system.

Referring to Figs. 15 and 16, I have illustrated a somewhat simplified type of interrupter switch which may be substituted in the Fig. 11 system for switch K. In Fig. 15 the interrupter switch K' comprises three inwardly springing terminal conductors 105', 106', and 107' which are wired just as described for terminals 105, 106 and 107 respectively. However, rod 90 now terminates rearwardly in an insulating head 175 having a conducting body 176 inserted therein. When piston 76 moves forwardly in taking up gap 118, terminals 105', 106' and 107' are all connected by conducting insert 176 during the same one-third of the forward piston stroke. The operation of the system when using switch K' is identical to that aforesaid.

I claim:

1. A power transmission for driving a vehicle having an engine provided with an ignition system and a throttle; a transmission drive-controlling element operable from a first position to a second position for effecting a step-up change in the transmission drive speed ratio and from said second position to said first position when operation of said ignition system is interrupted to relieve thrust at said element; a reciprocatory thrust member movable in a direction of thrust transmission from a first position to a second position thereby to effect operation of said element from its said second position to its said first position, said thrust member being movable in a return direction from its said second position to its said first position to accommodate movement of said element to its said second position; means biasing said element from its said first position to its said second position; means providing a lost-motion connection between said thrust member and said element such that said thrust member is capable of limited movement, relative to said element, from its said first position toward its said second position to a position intermediate its said first and second positions when said element is in its said second position; power operating means for moving said thrust member from its said second position to its said first position; means biasing said thrust member from its said first position to its said second position; electromagnetic means comprising a flux-generating holding coil adapted, when energized, to releasably hold said thrust member in its said first position and, when de-energized, to release said thrust member for movement thereof to its said intermediate position; a governor switch; means for controlling opening and closing of said governor switch as a function of vehicle drive speed such that said governor switch will open in response to bringing the vehicle to rest and will close in response to predetermined speed of drive of the vehicle; a kickdown switch biased to closed position; an accelerator pedal for controlling operation of said throttle; means controlled by said pedal for opening said kickdown switch in response to movement of said pedal in throttle-opening direction; an ignition interrupter switch comprising three terminals adapted to be bridged and unbridged for switch closed and opened functions; means operable as a function of movement of said thrust member for controlling said interrupter switch such that said interrupter switch is open when said thrust member is in its said first and second positions but is closed as an incident to movement of said thrust member from its said first position to its said intermediate position; a time-delay relay comprising a set of relay points biased to open position; a relay coil adapted to effect closing of said points; an electrical circuit for controlling energization of said holding coil, including said governor switch and said kickdown switch in series with said holding coil; said circuit including a source of electrical energy; a ground for one of said interrupter switch terminals; a ground for one end of said relay coil; conductor means including a resistance interposed therein connecting the other end of said relay coil to said circuit so as to receive current from said energy source when said kickdown and governor switches are open; a ground circuit for interrupting said ignition system, including said relay points in series with another of said interrupter switch terminals, and including said one interrupter switch terminal; and means for electrically connecting the third of said interrupter switch terminals with said relay coil conductor means between said resistance and said relay coil.

2. A power transmission according to claim 1 wherein the ohmic value of said relay coil is relatively great with respect to the ohmic value of said resistance and holding coil.

3. A power transmission for driving a vehicle having an engine provided with an ignition system and a throttle; a transmission drive-controlling element operable from a first position to a second position for effecting a step-up change in the transmission drive speed ratio and from said second position to said first position when operation of said ignition system is interrupted to relieve thrust at said element; a reciprocatory thrust member movable in a direction of thrust transmission from a first position to a second position thereby to effect operation of said element from its said second position to its said first position, said thrust member being movable in a return direction from its said second position to its said first position to accommodate movement of said element to its said second position; means biasing said element from its said first position to its said second position; means providing a lost-motion connection between said thrust member and said element such that said thrust member is capable of limited movement, relative to said element, from its said first position toward its said second position to a position intermediate its said first and second positions when said element is in its said second position; power operating means for moving said thrust member from its said second position to its said first position; means biasing said thrust member from its said first position to its said second position; electromagnetic means comprising a flux-generating holding coil adapted, when energized, to releasably hold said thrust member in its said first position and, when de-energized, to release said thrust member for movement thereof to its said intermediate position; a governor switch; means for controlling opening and closing of said governor switch as a function of vehicle drive speed such that said governor switch will open in response to bringing the vehicle to rest and will close in response to predetermined speed of drive of the vehicle; a kickdown switch biased to closed position; an accelerator pedal for controlling operation of said throttle; means controlled by said pedal for opening said kickdown switch in response to movement of said pedal in throttle-opening direction; an ignition interrupter switch; means operable as a function of movement of said thrust member for controlling said interrupter switch such that said interrupter switch will close in response to movement of said thrust member from its said first position to its said intermediate position; an electrical circuit for controlling energization of said holding coil, including said governor switch and said kickdown switch in series with said holding coil; a time-delay relay comprising a pair of relay points and a relay coil therefor; a ground circuit for interrupting said ignition system, including said relay points and said interrupter switch; and additional electrical circuit means connecting said coils and interrupter switch for causing said relay points to close in response to opening of either of said governor or kickdown switches and, with said interrupter switch remaining closed, to thereafter open with predetermined time delay.

4. A power transmission according to claim 3 wherein said additional circuit means comprises a resistance connecting said coils, said resistance being of substantially less ohmic value than that of said relay coil.

5. A power transmission for driving a vehicle having an engine provided with an ignition system and a throttle; a transmission drive controlling element operable from a first position to a second position for effecting a step-up change in the transmission drive speed ratio and from said second position to said first position when operation of said ignition system is interrupted to relieve thrust at said element; a reciprocatory thrust member movable in a direction of thrust transmission from a first position to a second position thereby to effect operation of said element from its said second position to its said first position, said thrust member being movable in a return direction from its said second position to its said first position to accommodate movement of said element to its said second position; power operating means for moving said thrust member from its said second position to its said first position; means biasing said thrust member from its said first position to its said second position; electromagnetic means comprising a flux-generating holding coil adapted, when energized, to releasably hold said thrust member in its said first position and, when de-energized, to release said thrust member for movement thereof from its said first position toward its said second position; a governor switch; means for controlling opening and closing of said governor switch as a function of vehicle drive speed such that said governor switch will open in response to bringing the vehicle to rest and will close in response to predetermined speed of drive of the vehicle; a kickdown switch biased to closed position; an accelerator pedal for controlling operation of said throttle; means controlled by said pedal for opening said kickdown switch in response to movement of said pedal in throttle-opening direction; an ignition interrupter switch comprising three terminals adapted to be bridged and unbridged for switch closed and opened functions; means operable as a function of movement of said thrust member for controlling said interrupter switch such that said interrupter switch is open when said thrust member is in its said first and second positions but is closed as an incident to movement of said thrust member from its said first position toward its said second position; a time-delay relay comprising a set of relay points biased to open position; a relay coil adapted to effect closing of said points; an electrical circuit for controlling energization of said holding coil, including said governor switch and said kickdown switch in series with said holding coil; said circuit including a source of electrical energy; a ground for one of said interrupter switch terminals; a ground for one end of said relay coil; conductor means including a resistance interposed therein connecting the other end of said relay coil to said circuit so as to receive current from said energy source when said kickdown and governor switches are open; a ground circuit for interrupting said ignition system, including said relay points in series with another of said interrupter switch terminals, and including said one interrupter switch terminal; and means for electrically connecting the third of said interrupter switch terminals with said relay coil conductor means between said resistance and said relay coil.

6. A power transmission for driving a vehicle having an engine provided with an ignition system and a throttle; a transmission drive-controlling element operable from a first position to a second position for effecting a step-up change in the transmission drive speed ratio and from said second position to said first position when operation of said ignition system is interrupted to relieve thrust at said element; a reciprocatory thrust member movable in a direction of thrust transmission from a first position to a second position thereby to effect operation of said element from its said second position to its said first position, said thrust member being movable in a return direction from its said second position to its said first position to accommodate movement of said element to its said second position; power operating means for moving said thrust member from its said second position to its said first position; means biasing said thrust member from its said first position to its said second position; electromagnetic means comprising a flux-generating holding coil adapted, when energized, to releasably hold said thrust member in its said first position and, when de-energized, to release said thrust member for movement thereof from its said first position toward its said second position; a governor switch; means for controlling opening and closing of said governor switch as a function of vehicle drive speed such that said governor switch will open in response to bringing the vehicle to rest and will close in response to predetermined speed of drive of the vehicle; a kickdown switch biased to closed position; an accelerator pedal for controlling operation of said throttle; means controlled by said pedal for opening said kickdown switch in response to movement of said pedal in throttle-opening direction; an ignition interrupter switch; means operable as a function of movement of said thrust member for controlling said interrupter switch such that said interrupter switch will close in response to movement of said thrust member from its said first position toward its said second position; an electrical circuit for controlling energization of said holding coil, including said governor switch and said kickdown switch in series with said holding coil; a time-delay relay comprising a pair of relay points and a relay coil therefor; a ground circuit for interrupting said ignition system, including said relay points and said interrupter switch; and additional electrical circuit means connecting said coils and interrupter switch for causing said relay points to close in response to opening of either of said governor or kickdown switches and, with said interrupter switch remaining closed, to thereafter open with predetermined time delay.

7. A power transmission for driving a vehicle having an engine provided with an ignition system; a transmission drive-controlling element operable from a first position to a second position for effecting a step-up change in the transmission drive speed ratio and from said second position to said first position when operation of said ignition system is interrupted to relieve thrust at said element; a reciprocatory thrust member movable in a direction of thrust transmission from a first position to a second position thereby to effect operation of said element from its said second position to its said first position, said thrust member being movable in a return direction from its said second position to its said first position to accommodate movement of said element to its said second position; means biasing said element from its said first position to its said second position; means providing a lost-motion connection between said thrust member and said element such that said thrust member is capable of limited movement, relative to said element, from its said first position toward its said second position to a position intermediate its said first and second positions when said element is in its said second position; power operating means for moving said thrust member from its said second position to its said first position; means biasing said thrust member from its said first position to its said second position; electromagnetic means comprising a flux-generating holding coil adapted, when energized, to releasably hold said thrust member in its said first position and, when de-energized, to release said thrust member for movement thereof to its said intermediate position; a governor switch; means for controlling opening and closing of said governor switch as a function of vehicle drive speed such that said governor switch will open in response to bringing the vehicle to rest and will close in response to predetermined speed of drive of the vehicle; an ignition interrupter switch comprising three terminals adapted to be bridged and unbridged for switch closed and opened functions; means operable as a function of movement of said thrust member for controlling said interrupter switch such that said interrupter switch is open when said thrust member is in its said first and second positions but is closed as an incident to movement of said thrust member from its said first position to its said intermediate position; a time-delay relay comprising a set of relay points biased to open position; a relay coil adapted to effect closing of said points; an electrical circuit for controlling energization of said holding coil, including said governor switch in series with said holding coil; said circuit including a source of electrical energy; a ground for one of said interrupter switch terminals; a ground for one end of said relay coil; conductor means including a resistance interposed therein connecting the other end of said relay coil to said circuit so as to receive current from said energy source when said governor switch is open; a ground circuit for interrupting said ignition system, including said relay points in series with another of said interrupter switch terminals, and including said one interrupter switch terminal; and means for electrically connecting the third of said interrupter switch terminals with said relay coil conductor means between said resistance and said relay coil.

8. A power transmission for driving a vehicle having an engine provided with an ignition system; a transmission drive-controlling element operable from a first position to a second position for effecting a step-up change in the transmission drive speed ratio and from said second position to said first position when operation of said ignition system is interrupted to relieve thrust at said element; a reciprocatory thrust member movable in a direction of thrust transmission from a first position to a second position thereby to effect operation of said element from its said second position to its said first position, said thrust member being movable in a return direction from its said second position to its said first position to accommodate movement of said element to its said second position; power operating means for moving said thrust member from its said second position to its said first position; means biasing said thrust member from its said first position to its said second position; electromagnetic means comprising a flux-generating holding coil adapted, when energized, to releasably hold said thrust member in its said first position and, when de-energized, to release said thrust member for movement thereof from its said first position toward its said second position; a governor switch; means for controlling opening and closing of said governor switch as a function of vehicle drive speed such that said governor switch will open in response to bringing the vehicle to rest and will close in response to predetermined speed of drive of the vehicle; an ignition interrupter switch; means operable as a function of movement of said thrust member for controlling said interrupter switch such that said interrupter switch will close in response to movement of said thrust member from its said first position toward its said second position; an electrical circuit for controlling energization of said holding coil, including said governor switch in series with said holding coil; a time-delay relay comprising a pair of relay points and a relay coil therefor; a ground circuit for interrupting said ignition system, including said relay points and said interrupter switch; and additional electrical circuit means connecting said coils and interrupter switch for causing said relay points to close in response to opening of said governor switch and, with said interrupter switch remaining closed, to thereafter open with predetermined time delay.

9. A power transmission for driving a vehicle having an engine provided with an ignition system and a throttle; a transmission drive-controlling element operable from a first position to a second position for effecting a step-up change in the transmission drive speed ratio and from said second position to said first position when operation of said ignition system is interrupted to relieve thrust at said element; a reciprocatory thrust member movable in a direction of thrust transmission from a first position to a second position thereby to effect operation of said element from its said second position to its said first position, said thrust member being movable in a return direction from its said second position to its said first position to accommodate movement of said element to its said second position; means biasing said element from its said first position to its said second position; means providing a lost-motion connection between said thrust member and said element such that said thrust member is capable of limited movement, relative to said element, from its said first position toward its said second position to a position itnermediate its said first and second positions when said element is in its said second position; power operating means for moving said thrust member from its said second position to its said first position; means biasing said thrust member from its said first position to its said second position; electromagnetic means comprising a flux-generating holding coil adapted, when energized, to releasably hold said thrust member in its said first position and, when de-energized, to reelase said thrust member for movement thereof to its said intermediate position; a kickdown switch biased to closed position; an accelerator pedal for controlling operation of said throttle; means controlled by said pedal for opening said kickdown switch in response to movement of said pedal in throttle-opening direction; an ignition interrupter switch comprising three terminals adapted to be bridged and unbridged for switch closed and opened functions; means operable as a function of movement of said thrust member for controlling said interrupter switch such that said interrupter switch is open when said thrust member is in its said first and second positions but is closed as an incident to movement of said thrust member from its said first position to its said intermediate position; a time-delay relay comprising a set of relay points biased to open position; a relay coil adapted to effect closing of said points; an electrical circuit for controlling energization of said holding coil, including said kickdown switch in series with said holding coil; said circuit including a source of electrical energy; a ground for one of said interrupter switch terminals; a ground for one end of said relay coil; conductor means including a resistance interposed therein connecting the other end of said relay coil to said circuit so as to receive current from said energy source when said kickdown switch is open; a ground circuit for interrupting said ignition system, including said relay points in series with another of said interrupter switch terminals, and including said one interrupter switch terminal; and means for electrically connecting the third of said interrupter switch terminals with said relay coil conductor means between said resistance and said relay coil.

10. A power transmission for driving a vehicle having an engine provided with an ignition system and a throttle; a transmission drive-controlling element operable from a first position to a second position for effecting a step-up change in the transmission drive speed ratio and from said second position to said first position when operation of said ignition system is interrupted to relieve thrust at said element; a reciprocatory thrust member movable in a direction of thrust transmission from a first position to a second position thereby to effect operation of said element from its said second position to its said first position, said thrust member being movable in a return direction from its said second position to its said first position to accommodate movement of said element to its said second position; power operating means for moving said thrust member from its said second position to its said first position; means biasing said thrust member from its said first position to its said second position; electromagnetic means comprising a flux-generating holding coil adapted, when energized, to releasably hold said thrust member in its said first position and, when de-energized, to release said thrust member for movement thereof from its said first position toward its said second position; a kickdown switch biased to closed position; an accelerator pedal for controlling operation of said throttle; means controlled by said pedal for opening said kickdown switch in response to movement of said pedal in throttle-opening direction; an ignition interrupter switch; means operable as a function of movement of said thrust member for controlling said interrupter switch such that said interrupter switch will close and then open in response to movement of said thrust member from its said first position toward its said second position; an electrical circuit for controlling energization of said holding coil, including said kickdown switch in series with said holding coil; a time-delay relay comprising a pair of relay points and a relay coil therefor; a ground circuit for interrupting said ignition system, including said relay points and said interrupter switch; and additional electrical circuit means connecting said coils and interrupter switch for causing said relay points to close in response to opening of said kickdown switch and, upon failure of said interrupter switch to open as aforesaid, to thereafter open with predetermined time delay.

11. In a power transmission for driving a vehicle having an engine provided with an ignition system and a throttle; relatively engageable drive control elements one being movable relative to the other to effect disengagement of said elements when operation of said ignition system is interrupted; a thrust member operable from a first position thereof to a second position thereof in transmitting thrust for moving said movable element as aforesaid; electromagnetic means comprising a flux-generating holding coil adapted, when energized, to releasably hold said thrust member in its said first position; a spring biasing said thrust member toward its said second position; a governor switch; means for controlling opening and closing of said governor switch as a function of vehicle drive speed such that said governor switch will open in response to bringing the vehicle to rest and will close in response to predetermined speed of drive of the vehicle; a kickdown switch biased to closed position; an accelerator pedal for controlling operation of said throttle; means controlled by said pedal for opening said kickdown switch in response to movement of said pedal in throttle-opening direction; an ignition interrupter switch comprising three terminals adapted to be bridged and unbridged for switch closed and opened functions; means operable as a function of movement of said thrust member for controlling said interrupter switch such that said interrupter switch is open when said thrust member is in its said first and second positions but is closed as an incident to movement of said thrust member from its said first position toward its said second position; a time-delay relay comprising a set of relay points biased to open position; a relay coil adapted to effect closing of said points; an electrical circuit for controlling energization of said holding coil, including said governor switch and said kickdown switch in series with said holding coil; said circuit including a source of electrical energy; a ground for one of said interrupter switch terminals; a ground for one end of said relay coil; conductor means including a resistance interposed therein connecting the other end of said relay coil to said circuit so as to receive current from said energy source when said kickdown and governor switches are open; a ground circuit for interrupting said ignition system, including said relay points in series with another of said interrupter switch terminals, and including said one interrupter switch terminal; and means for electrically connecting the third of said interrupter switch terminals with said relay coil conductor means between said resistance and said relay coil.

12. In a power transmission for driving a vehicle having an engine provided with an ignition system; relatively engageable drive control elements one being movable relative to the other to effect disengagement of said elements when operation of said ignition system is interrupted; a thrust member operable from a first position thereof to a second position thereof in transmitting thrust for moving said movable element as aforesaid; electromagnetic means comprising a flux-generating holding coil adapted, when energized, to releasably hold said thrust member in its said first position; a spring biasing said thrust member toward its said second position; a control switch adapted to be opened and closed; an ignition interrupter switch; means operable as a function of movement of said thrust member for controlling said interrupter switch such that said interrupter switch will close and then open in response to movement of said thrust member from its said first position toward its said second position; an electrical circuit for controlling energization of said holding coil, including said control switch in series with said holding coil; a time-delay relay comprising a pair of relay points and a relay coil therefor; a ground circuit for interrupting said ignition system, including said relay points and said interrupter switch; and additional electrical circuit means connecting said coils and interrupter switch for causing said relay points to close in response to opening of said control switch and, upon failure of said interrupter switch to open as aforesaid, to thereafter open with predetermined time delay.

13. In a power transmission for driving a vehicle; relatively engageable drive control elements one being movable relative to the other to effect disengagement of said elements when torque between said elements is relieved; a thrust member operable from a first position thereof to a second position thereof in transmitting thrust for moving said movable element as aforesaid; releasable holding means for holding said thrust member in its said first position; a spring biasing said thrust member toward its said second position; torque relieving means operable to facilitate disengagement of said drive control elements; a governor switch; means for controlling opening and closing of said governor switch as a function of vehicle drive speed such that said governor switch will open in response to bringing the vehicle to rest and will close in response to predetermined speed of drive of the vehicle; a torque-relieving control switch; means operable as a function of movement of said thrust member for controlling said torque-relieving control switch such that this switch will close in response to movement of said thrust member from its said first position toward its said second position; an electrical circuit for controlling said releasable holding means, including said governor switch; a time-delay relay for controlling operation of said torque relieving means in conjunction with said torque-relieving control switch; and additional electrical circuit means connecting said relay with the first said circuit and said torque-relieving control switch for rendering said torque relieving means inoperable within a predetermined lapse of time after closing of said torque-relieving switch as aforesaid.

14. A power transmission for driving a vehicle having an engine provided with an ignition system; a member movable for controlling speed ratio change in the transmission; a source of electrical energy; a control switch adapted to be opened and closed; means including an electromagnet coil for controlling movement of said member; a circuit including said electromagnet coil and control switch for controlling energization of this coil; a time-delay relay comprising a set of relay points and a grounded relay coil for controlling opening and closing of said points; an interrupter switch comprising three terminals adapted to be bridged in response to movement of said member; means for grounding one of said terminals; a second circuit for interrupting said ignition system comprising said relay points and two of said three interrupter switch terminals including said grounded terminal; a resistance; a third circuit including said resistance in series between said coils; and a fourth circuit including said electromagnet coil, said resistance, the remainder of said three interrupter switch terminals, and said grounded interrupter switch terminal.

VICTOR E. MATULAITIS.